United States Patent
Niu et al.

(10) Patent No.: US 7,917,488 B2
(45) Date of Patent: Mar. 29, 2011

(54) CROSS-LINGUAL SEARCH RE-RANKING

(75) Inventors: Cheng Niu, Beijing (CN); Ming Zhou, Beijing (CN)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 12/041,629

(22) Filed: Mar. 3, 2008

(65) Prior Publication Data

US 2009/0222437 A1    Sep. 3, 2009

(51) Int. Cl.
G06F 7/00      (2006.01)
G06F 17/30     (2006.01)

(52) U.S. Cl. ......................... 707/706; 707/760
(58) Field of Classification Search .................. 707/707, 707/760; 704/8, 277
See application file for complete search history.

(56) References Cited

U.S. PATENT DOCUMENTS

| | | | |
|---|---|---|---|
| 5,301,109 A | | 4/1994 | Landauer et al. |
| 5,787,410 A | * | 7/1998 | McMahon .................... 707/760 |
| 5,956,740 A | * | 9/1999 | Nosohara ...................... 715/264 |
| 6,055,528 A | * | 4/2000 | Evans ............................... 1/1 |
| 6,064,951 A | | 5/2000 | Park et al. |
| 6,081,774 A | * | 6/2000 | de Hita et al. ..................... 704/9 |
| 6,321,189 B1 | | 11/2001 | Masuichi et al. |
| 6,321,191 B1 | | 11/2001 | Kurahashi |
| 6,370,498 B1 | * | 4/2002 | Flores et al. ....................... 704/3 |
| 6,381,598 B1 | * | 4/2002 | Williamowski et al. .......... 704/1 |
| 6,604,101 B1 | * | 8/2003 | Chan et al. .................... 707/706 |
| 7,146,358 B1 | | 12/2006 | Gravano et al. |
| 7,149,688 B2 | * | 12/2006 | Schalkwyk .................. 704/255 |
| 7,194,455 B2 | | 3/2007 | Zhou et al. |
| 7,260,570 B2 | | 8/2007 | Brown et al. |
| 7,269,598 B2 | | 9/2007 | Marchisio |
| 7,720,856 B2 | * | 5/2010 | Goedecke et al. ............ 707/759 |
| 7,809,714 B1 | | 10/2010 | Smith |
| 7,814,103 B1 | | 10/2010 | Gravano et al. |
| 2001/0029455 A1 | | 10/2001 | Chin et al. |
| 2002/0111792 A1 | | 8/2002 | Cherny |
| 2004/0230417 A1 | * | 11/2004 | Kraiss et al. ....................... 704/8 |
| 2005/0071152 A1 | | 3/2005 | Morimoto et al. |
| 2005/0273318 A1 | | 12/2005 | Zhou et al. |
| 2006/0009963 A1 | | 1/2006 | Gaussier et al. |
| 2006/0173839 A1 | * | 8/2006 | Knepper et al. .................. 707/5 |

(Continued)

OTHER PUBLICATIONS

Diligenti et al. "A Unified Probabilistic Framework for Web Page Scoring Systems", Published on Jan. 2004 in IEEE Transactions on Knowledge and Data Engineering, IEEE, vol. 16, No. 1; pp. 4-16.*

(Continued)

*Primary Examiner* — Yicun Wu
*Assistant Examiner* — Pavan Mamillapalli
(74) *Attorney, Agent, or Firm* — Lee & Hayes, PLLC

(57) ABSTRACT

Cross-lingual search re-ranking is performed during a cross-lingual search in which a search query of a first language is used to retrieve two sets of documents, a first set in the first language, and a second set in a second language. The two sets of documents are each first ranked by the search engine separately. Cross-lingual search re-ranking then aims to provide a uniform re-ranking of both sets of documents combined. Cross-lingual search re-ranking uses a unified ranking function to compute the ranking order of each document of the first set and the second set of documents. The unified ranking function is constructed using generative probabilities based on multiple features, and can be learned by optimizing weight parameters using a training corpus. Ranking SVM algorithms may be used for the optimization.

20 Claims, 5 Drawing Sheets

U.S. PATENT DOCUMENTS

| | | |
|---|---|---|
| 2006/0173886 A1 | 8/2006 | Moulinier et al. |
| 2006/0265209 A1 | 11/2006 | Bradford |
| 2007/0022134 A1 | 1/2007 | Zhou et al. |
| 2007/0027905 A1 | 2/2007 | Warren et al. |
| 2008/0288474 A1 | 11/2008 | Chin et al. |
| 2009/0125497 A1 | 5/2009 | Jiang et al. |

OTHER PUBLICATIONS

Gao et al. "Cross-Lingual Query Suggestion Using Query Logs of Different Languages", Published on Jul. 2007 in SIGIR 2007 Proceedings, Session 19; pp. 463-470.*

Ballesteros et al., "Phrasal Translation and Query Expansion Techniques for Cross-Language Information Retrieval," In Proceedings of the 20th Annual International ACM SIGIR, 1997, 8 pgs.

Gleich et al., "SVD Subspace Projections for Term Suggestion Ranking and Clustering," In Technical Report, Yahoo! Research Labs, 2004, 7 pgs.

Hull, "Using Statistical Testing in the Evaluation of Retrieval Experiments," In Proc. SIGIR, 1993, 9 pgs.

Jang et al, "Using Mutual Information to Resolve Query Translation Ambiguities and Query Term Weighting," ACM, 1999, pp. 223-229.

Jeon, et al, "Finding Similar Questions in Large Question and Answer Archives," In Proc. CIKM, 2005, 7 pgs.

Lavrenko, et al., "Cross-Lingual Relevance Models," In Proc. SIGIR, 2002, 8 pgs.

Lu et al, "Towards Web Mining of Query Translations for Cross-Language Information Retrieval in Digital Libraries," ICADL, 2003, 12 pgs.

McNamee et al, "Comparing Cross-Language Query Expansion Techniques by Degrading Translation Resources," In Proc. SIGIR 2002, pp. 159-166.

Nie et al, "Cross-Language Information Retrieval based on Parallel Texts and Automatic Mining of Parallel Texts from the Web," SIGIR, 1999, 8 pgs.

Wang et al, "Translating Unknown Cross-Lingual Queries in Digital Libraries Using a Web-based Approach," Proceedings of the 2004 Joint ACM/IEEE Conference on Digital Libraries (JCDL'04), 2004, pp. 108-116.

Burges et al, "Learning to Rank using Gradient Descent," Proceedings ICML, 2005, Germany, pp. 89-96.

Cao et al, "Adapting Ranking SVM to Document Retrieval," In Proceedings of SIGIR '06, 2006, 8 pgs.

Gao et al, "Cross-Lingual Query Suggestion Using Query Logs of Different Languages," Proceedings of SIGIR '07, ACM, 2007, Amsterdam, 8 pgs.

Gao, et al., "Statistical Query Translation Models for Cross-Language Information Retrieval", at <<http://research.microsoft.com/~jfgao/paper/gao_nie_zhou.talip2006.rev.pdf>>, ACM, Dec. 2005, pp. 36.

Pingali, et al., "Experiments in Cross Language Query Focused Multi-Document Summarization", available at least as early as Nov. 2, 2007, at <<http://search.iiit.ac.in/CLIA2007/papers/CLQSum.pdf>>, pp. 7.

Tur, et al., "Using Information Extraction to Improve Cross-lingual Document Retrieval", available at least as early as Nov. 2, 2007, at <<http://www.cs.nyu.edu/hengji/CrosslingualIEIR.pdf>>, pp. 7.

Ponte et al, "A Language Modeling Approach to Information Retrieval," In Proceedings of SIGIR '98, ACM, 1998, 7 pgs.

Robertson et al, "Okapi at TREC-3," In ProceedingsTREC-3, 1995, 19 pgs.

* cited by examiner

```
┌─────────────────────────────────────────────┐
│  BUILD A TRAINING CORPUS OF AT LEAST ONE QUERY AND A
│  SET OF CANDIDATE DOCUMENTS IN BOTH THE FIRST
│  LANGUAGE AND THE SECOND LANGUAGE, EACH CANDIDATE
│  DOCUMENT BEING ASSIGNED A RELEVANCE RANK
│                     310
└─────────────────────────────────────────────┘
                       │
                       ▼
┌─────────────────────────────────────────────┐
│  GENERATE FEATURE VECTORS FOR EACH QUERY-
│  DOCUMENT PAIR IN THE TRAINING CORPUS IN A FEATURE
│  SPACE UNIFIED FOR THE FIRST AND THE SECOND
│                  LANGUAGES
│                     320
└─────────────────────────────────────────────┘
                       │
                       ▼
┌─────────────────────────────────────────────┐
│  PERFORM SUPERVISED LEARNING (E.G., SVM
│  CLASSIFICATION) USING THE TRAINING CORPUS AND THE
│  ASSIGNED RELEVANCE RANKS TO OPTIMIZE WEIGHT
│  PARAMETERS OF A UNIFIED RANKING FUNCTION
│                     330
└─────────────────────────────────────────────┘
                       │
                       ▼
     ┌───────────────────────────────────┐
    /   OUTPUT: TRAINED WEIGHT           /
   /    PARAMETERS OF THE UNIFIED       /
  /     RANKING FUNCTION               /
 /                340                 /
 └───────────────────────────────────┘
```

Fig. 3

CROSS-LINGUAL SEARCH RE-RANKING

BACKGROUND

The web participation of various languages in addition to English, both in terms of Web documents and Internet users, has been rapidly rising. The task of search across multiple languages is becoming more and more demanding. However, multi-lingual information retrieval (MLIR) for web pages remains challenging due to the apparent language barriers. One of the dominant approaches is to bridge the gap between the query and the documents by translating the query in the source language into the target language, or translating the documents in the target language to the source language. To this end, cross-lingual search has been assisted by machine translation, which has seen substantial development in the recent years.

In addition to machine translation, ranking the retrieved pages of different languages is another critical issue. In general, search result ranking is one of the central problems for many IR applications. In the past, research attention has focused on monolingual search result ranking, in which the retrieved documents are all written in the same language. With the rise of the importance of multilanguage content and usage on the web, the importance of ranking for multilingual information retrieval (MLIR) is also increasing.

MLIR is defined as a task to retrieve relevant documents in multiple languages, and then rank the retrieved documents based on their relevancy to the query. Most existing approaches to MLIR require query translation followed by a monolingual IR. Typically, the queries are translated either using a bilingual dictionary, machine translation software or a parallel corpus. One of the challenges of MLIR is the difficulties to estimate the cross-lingual relevancy because of the information loss due to imperfect translation. Other factors, such as the need to compare and merge appropriately documents in multiple languages, make MLIR ranking even more difficult.

Ranking has been extensively explored in the monolingual IR studies. Particularly, machine learning approaches for ranking, known as learning-to-rank, have received intensive attentions in recent years. The learning task is to optimize a ranking function given a set of training data consisting of queries, their retrieved documents, and the relevance ranks of the documents made by human judgments. The learned ranking function is then used to predict the order of the retrieved documents for a new query.

However, even the learned-to-drank techniques of the existing methods do not learn a cross-lingual ranking function directly, nor do they directly estimate the contribution of individual ranking features to the MLIR relevancy. Instead, existing MLIR ranking techniques usually combine translation and monolingual IR to derive some relevancy scores which are then converted by some normalization methods to become comparable for combination and ranking. In MLIR, candidate documents retrieval is usually followed by a re-ranking process to merge several ranked document lists together. Existing MLIR ranking algorithms are focused on how to compare and combine the ranking scores associated with each document list for a merge. The MLIR ranking usually starts with a set of normalization methods which convert the relevance scores of different lists comparable. Typical normalization methods include Min-Max, Z-score, CORI, etc. The normalized scores are then combined based on either CombSUM algorithm or logistic regression model to generate the final MLIR relevance score. These learned-to-drank techniques do not learn ranking function directly, nor do they directly estimate the contribution of individual ranking features to the MLIR relevancy. These techniques hence do not work well for multi-lingual web search which involves a large amount of features.

Although learning-to-rank has become an active research field, there is little research effort to adapt the state-of-the-art ranking algorithms for multi-lingual search. Further effort in this direction is needed to develop better cross-lingual ranking or re-ranking techniques.

SUMMARY

Disclosed is a cross-lingual search re-ranking technique used during a cross-lingual search. In a cross-lingual search, a search query of a first language is used to retrieve two sets of documents, a first set in the first language, and a second set in a second language. The two sets of documents are each ranked by the search engine separately. Cross-lingual search re-ranking aims to provide a uniform ranking of both sets of documents when combined or merged. Cross-lingual search re-ranking uses a unified ranking function to compute the ranking order of each document of the first set and the second set of documents. Cross-lingual search re-ranking is particularly helpful for search engine users who can read documents in a foreign language but may have difficulties in constructing efficient search queries in that language.

In one embodiment, the unified ranking function is constructed using generative probabilities based on multiple features, including monolingual relevancy features, query translation features, and document translation features. Examples of monolingual relevancy features include snippet-based BM25 score and title-based tf-idf score; examples of query translation features include dictionary-based score and bidirectional translation score based on parallel corpora; and examples of document translation features include IBM translation model score and phrase translation model score.

The weight parameters of the unified ranking function may be estimated by a learning algorithm applied to a training corpus, which may include a training query, a set of training candidate documents in both the first language and a second language, and a relevance rank assigned to each training candidate's document. SVM ranking algorithms such as RankSVM algorithm may be used for the optimization.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE FIGURES

The detailed description is described with reference to the accompanying figures. In the figures, the left-most digit(s) of a reference number identifies the figure in which the reference number first appears. The use of the same reference numbers in different figures indicates similar or identical items.

FIG. 3 is a flowchart of an exemplary process of estimating weight parameters of a unified ranking function in accordance with the present disclosure.

DETAILED DESCRIPTION

The cross-lingual search re-ranking techniques are described below with an overview of the processes followed by a further detailed description of the exemplary embodiments. In this description, the order in which a process is described is not intended to be construed as a limitation, and any number of the described process blocks may be combined in any order to implement the method, or an alternate method.

Cross-lingual re-ranking described herein addresses the issue of cross-lingual information retrieval on the web by users. Cross-lingual information retrieval arises in many Web search situations. For example, often users can read documents written by a foreign language, but have difficulty in formulating proper search queries in that foreign language to specify their search intensions. Or, the user may just desire to find and obtain a copy of a document in foreign language using a search query in native language for whatever reason, and may not read the foreign language document at all. Cross-lingual rewriting comes to help in such situations.

The disclosure aims to rank documents of multiple languages based on their relevancy to a user's query. This disclosure formulates the cross-lingual search re-ranking problem within the framework of discriminative ranking model. The advantage of this approach is to effectively make use of multiple heterogeneous features to achieve optimal performance.

Multilingual version of learning-to-rank described herein is targeted to learn a unified ranking function for documents of different languages. This is done by representing documents of different languages within a unified feature space and approaching the re-ranking in a manner similar to that for a monolingual ranking task.

The cross-lingual re-ranking framework proposed herein differs from existing MLIR ranking systems using machine learning. Although some MLIR ranking schemes involve machine learning, they focus on combining relevance scores associated with multiple retrieval settings, and ignore the direct modeling of each feature's contribution to MLIR relevancy. The resulting ranking algorithms therefore may not work optimally for Web MLIR which involves a large number of ranking features. As will be shown below, the cross-lingual re-ranking disclosed herein directly learns the MLIR ranking functions within the learning-to-rank framework.

Figure 1:
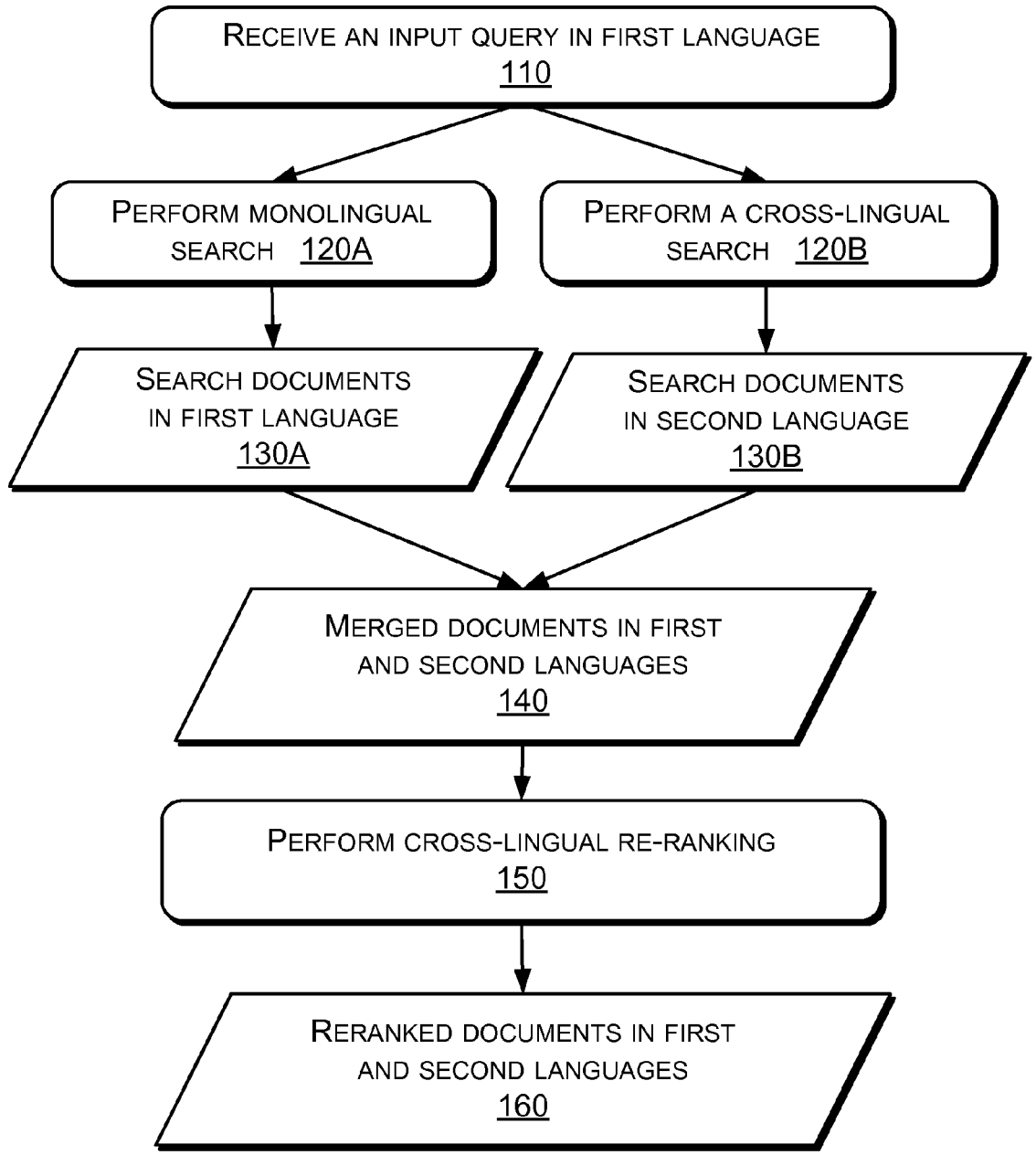
FIG. 1 is a flowchart of an exemplary cross-lingual search process using the cross-lingual re-ranking described herein.

FIG. 1 is a flowchart of an exemplary cross-lingual search process using the cross-lingual re-ranking described herein. At block 110, the cross-lingual re-ranking system (e.g., a search engine server) receives an input query in the first language, e.g., Chinese. The user who enters the input query in the first language may know the first language as his or her native language. The user formulates the input query as he would when performing a monolingual search. Similar to what is familiar in the context of monolingual search, the input query in a cross-lingual search may be of a variety of formats, ranging from simple one-word queries to sophisticated multi-phrase search queries using search operators.

At blocks 120A and 130A, the cross-lingual re-ranking system performs a monolingual search using the input query 110 in the first language to retrieve a set of search documents 130A in the first language.

At blocks 120B and 130B, the cross-lingual re-ranking system performs, in parallel to performing monolingual search in block 120A, a cross-lingual search using the same inputs search query 110 in the first language to retrieve a set of search documents 130B in the second language. For example, using an input query in Chinese, relevant documents in English may be retrieved as a result of the cross-lingual search. To conduct cross single search, any suitable cross-lingual information retrieval techniques may be applied.

At block 140, the set of search documents in the first language and the set of search documents in the second language are merged to obtain merged documents 140. The merge may be a straightforward merge in which two sets of documents are simply pooled together without any modifications, deletions or additions of documents. It is noted however, the merge may take place merely conceptually rather than physically. When the merge is physical, two sets of documents are actually combined into a united storage location to be accessed subsequently. However, the merge may be virtual or merely conceptual in which each set of the documents remains separate from each other, but are managed and accessed by the system as if they belonged to the same group of files.

At block 150, the cross-lingual re-ranking system performs cross-lingual re-ranking over the merged documents 140 in the first and the second languages to obtain re-ranked documents 160. As will be shown below, the cross-lingual re-ranking is based on the relevancy of documents 130A and 130B to the input query 110. The re-ranked documents 160 are then presented to the user according to their ranking, in any suitable manner similar to monolingual search applications.

For example, given a Chinese query (110), Chinese snippets (130A) are retrieved by monolingual search (120A), and English snippets (130B) are retrieved by cross-lingual search (120B). Then Chinese and English snippets (140) are merged and re-ranked (150) based their relevancy to the user's query (110) to obtain re-ranked documents (160) which are presented to the user.

Figure 2:
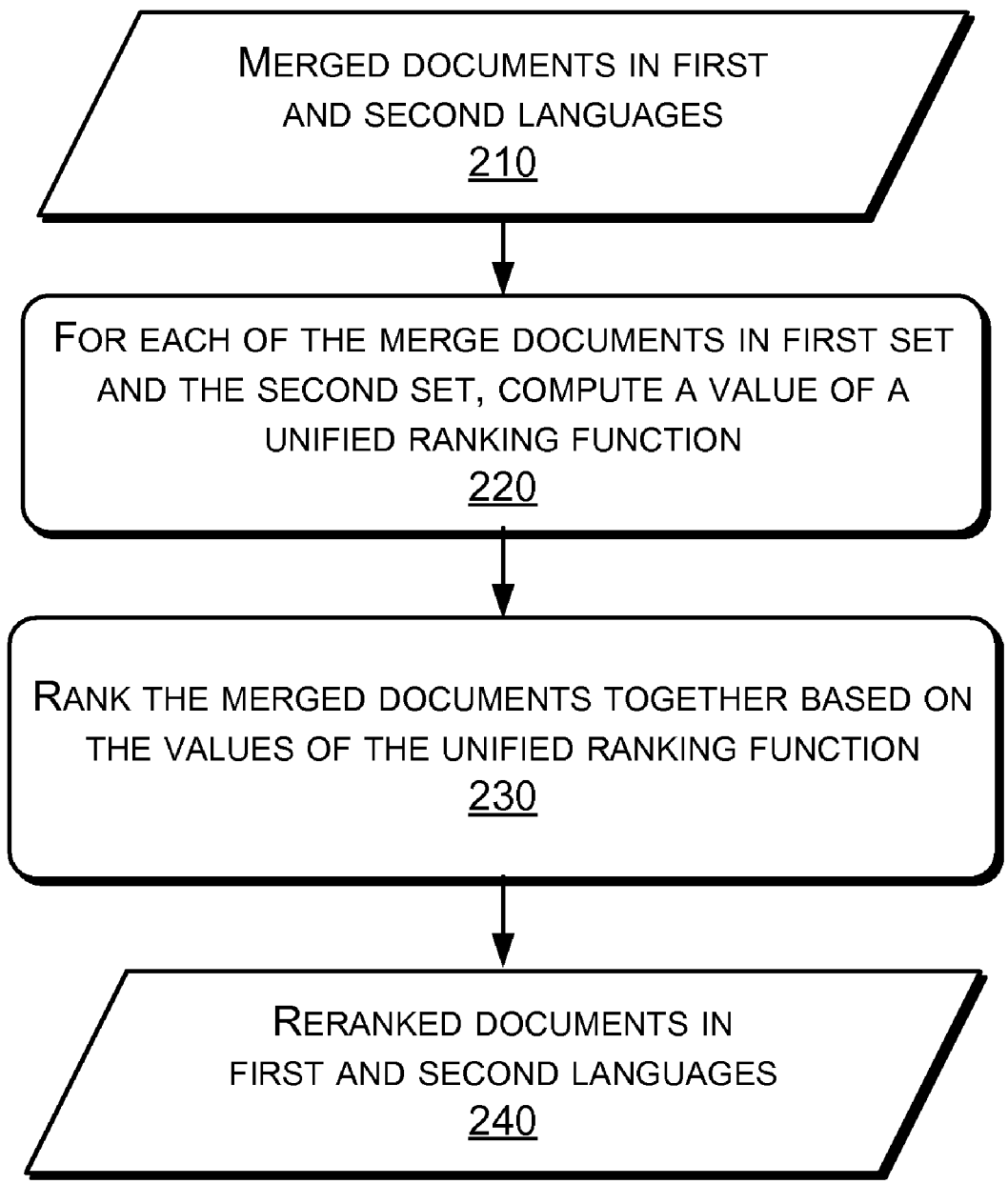
FIG. 2 is a flowchart of an exemplary process of cross-lingual re-ranking in accordance with the present disclosure.

FIG. 2 is a flowchart of an exemplary process of cross-lingual re-ranking in accordance with the present disclosure. Block 210 represents the merged documents 210 in first and second languages. This can be the intermediary result of the search process of FIG. 1, for example merged documents 140.

At block 220, the cross-lingual re-ranking system computes a value of unified ranking function for each of the merged documents 210. All documents, whether in the first language or the second language, are treated uniformly. Determination of unified ranking function is explained in further detail later in this description.

At block 230, the cross-lingual re-ranking system ranks the merged documents (both documents in the first language and documents in the second language) based on the respective values of the unified ranking function.

Block 240 represents the re-ranked documents in the first and the second languages. The re-ranked documents 240 are presented to the user according to their ranking order.

Unified Ranking Function

The present disclosure proposes a unified ranking function based on generative probabilities and multiple feature functions. An exemplary unified ranking function is described as follows. In the example, the first language is Chinese and the second language is English. It is appreciated, however, that the framework is applicable to any languages.

The relevancy between a query q and a document d can be measured by the conditional probability $P(q|d)$, i.e. the generative probability of query q given the observation of document d. Two different approaches are proposed to estimate cross-lingual relevancy. The two approaches correspond to query translation and document translation respectively. Each approach may be used independently or in combination with the other.

If query translation approach is used, the cross-lingual query generative probability of Chinese query $q_c$ given the observation of English document $d_e$ is estimated as $$P(q_c \mid d_e) = \sum_{q_e} P(q_e \mid q_c) P(q_e \mid d_e) \qquad (1)$$

where $P(q_e|q_c)$ refers to the probability of translating Chinese query $q_c$ into English query $q_e$, while $P(q_e|d_e)$ represents the monolingual generative probability of the English query $q_e$ given the observation of English document $d_e$.

If document translation approach is used, the cross-lingual query generative probability of Chinese query $q_c$ given the observation of English document $d_e$ is estimated as $$P(q_c \mid d_e) = \sum_{d_c} P(q_c \mid d_c) P(d_c \mid d_e) \qquad (2)$$

where $P(d_c|d_e)$ refers to the probability of translating English document $d_e$ into Chinese document $d_c$, while $P(q_c|d_c)$ represents the monolingual generative probability of the Chinese query $q_c$ given the observation of English document $d_c$.

The monolingual query generative probability $P(q_c|d_c)$ can be estimated using any available method used in monolingual search ranking. For example, the monolingual query generative probability $P(q_c|d_c)$ can be estimated in the framework of discriminative regression. In one exemplary embodiment, one has $$P(q_c \mid d_c) = \sum_i \lambda_i f_i(q_c, d_c) \qquad (3)$$

where $f_i(q_c, d_c)$ is a monolingual (i.e. between Chinese query and Chinese document) relevancy feature function, and $\lambda_i$ is the corresponding weight. The subscript index "i" represents multiplicity of such feature functions $f_i$. In practice, at least one monolingual relevancy feature functions is used.

Similarly, the monolingual query generative probability $P(q_e|d_e)$ can be estimated in the framework of discriminative regression as follows, $$P(q_e \mid d_e) = \sum_i \lambda_i f_i(q_e, d_e). \qquad (3a)$$

Above assumes that the same monolingual relevancy feature functions $f$ are used for both Chinese and English. In practice, although identical or similar monolingual relevancy feature functions may be used for both Chinese and English, different customized monolingual relevancy feature functions may also be used for different languages including Chinese and English.

Similar techniques such as regression estimation that are used to estimate the monolingual query generative probabilities $P(q_c|d_c)$ and $P(q_e|d_e)$ can also be applied to estimate query translation and document translation probabilities. In one exemplary embodiment, one has $$P(q_e \mid q_c) = \sum_j \lambda'_j g_j(q_e, q_c) \qquad (4)$$

and $$P(d_c \mid d_e) = \sum_k \lambda''_k h_k(d_c, d_e) \qquad (5)$$

where $g_j(q_e,q_c)$ is a feature function associated with query translation, and $h_k(d_c,d_e)$ is a feature function associated with document translation. The subscript indices "j" and "k" represent multiplicity of such feature functions. In practice, at least one feature function $g_j$ associated with query translation is used if the query translation approach is used. Likewise, at least one feature function $h_k$ associated with document translation is used if the document translation approach is used. Some embodiments may use both the query translation approach and the document translation approach.

Combining the above equations (1)-(5), the cross-lingual query generative probability can be estimated by either $$P(q_c \mid d_e) = \sum_{q_e} \sum_{i,j} \mu_{ij} f_i(q_e, d_e) g_j(q_c, q_e) \qquad (6)$$

in query translation approach, or $$P(q_c \mid d_e) = \sum_{d_c} \sum_{i,k} \pi_{ik} f_i(q_c, d_c) h_k(d_c, d_e) \qquad (7)$$

in document translation approach.

In one embodiment, a single (either unique or the best) translation query $q_e$ is used for Chinese query $q_c$, and a single (either unique or the best) translation document $d_c$ is used for English document $d_e$. Under such conditions, the cross-lingual query generative probability can be estimated by either $$P(q_c \mid d_e) = \sum_{i,j} \mu_{ij} f_i(q_e, d_e) g_j(q_c, q_e) \qquad (6a)$$

in query translation approach, or $$P(q_c \mid d_e) = \sum_{i,k} \pi_{ik} f_i(q_c, d_c) h_k(d_c, d_e) \qquad (7a)$$

in document translation approach. In practice, usually a query is likely to have multiple translations (and therefore Equation (6) should apply), while a document is likely to have just a single translation (and therefore Equation (7a) may apply).

The relevancy of an English document $d_e$ to Chinese query $q_c$ is thus measured by computing query generative probability using equation (6) or (7), or a combination thereof. To conduct such computation, weight parameters $\lambda_i$, $\mu_{ij}$ and $\pi_{ij}$ need to be first estimated. The estimation of these weight parameters is discussed further below.

Theoretically, $\lambda_i$, $\mu_{ij}$ and $\pi_{ij}$ can be estimated by optimizing Equation (3), (6) and (7). For example, given a training corpus of Chinese queries $q_c$ and their corresponding set of Chinese documents $d_c$ and English documents $d_e$ with known query generative probabilities, a suitable learning algorithm such as SVM regression may be used to optimize equations (3), (6) and (7) to estimate weight parameters $\lambda_i$, $\mu_{ij}$ and $\pi_{ij}$.

In practice, however, it is very difficult to directly optimize the approximation of the query generative probability due to the lack of training data. In the following, a preferred method for estimating weight parameters $\lambda_i$, $\mu_{ij}$ and $\pi_{ij}$ is described.

The preferred method for estimating weight parameters $\lambda_i$, $\mu_{ij}$ and $\pi_{ij}$ is based on the realization that search ranking only requires the order of the search results, and the true query generative probability may not be necessary. Therefore, it is possible to estimate $\lambda_i$, $\mu_{ij}$ and $\pi_{ij}$ by optimizing the search rank itself instead of the query generative possibilities. A unified ranking function may be constructed using the query generative probabilities. For example, the Equations (3), (6a) and (7a) can be combined to rank the cross-lingual relevancy. A resultant ranking function is given as follows:

$$\psi(q_c, d) = \begin{cases} \sum_i \lambda_i f_i(q_c, d_c) & \text{if } d \text{ is } d_c \\ \sum_{i,j} \mu_{ij} f_i(q_e, d_e) g_j(q_c, q_e) + \sum_{i,k} \pi_{ik} f_i(q_c, d_c) h_k(d_c, d_e) & \text{if } d \text{ is } d_e \end{cases} \quad (8)$$

The above ranking function $\psi(q_c,d)$ is unified for both Chinese documents $d_c$ and English documents $d_e$. With a unified ranking function, various algorithms used in developing monolingual ranking functions may be used to estimate weight parameters $\lambda_i$, $\mu_{ij}$ and $\pi_{ij}$, including learning-to-rank techniques such as ranking SVM methods. For example, a training corpus of various and corresponding candidate documents in both Chinese and English may be built; for each wary-document pair, a feature vector may be generated over a unified feature space used for both Chinese and English documents. Under this scheme, the present problem of estimating weight parameters is very much similar to one of a monolingual ranking function.

For multiple translations of Chinese query $q_c$ and English documents $d_e$, a combined unified ranking function may be constructed based on the unified ranking function $\psi(q_c,d)$ of the Eq. (8). Alternatively, each translation may be treated separately by applying the above Eq. (8) to each identified combination of translations.

FIG. 3 is a flowchart of an exemplary process of estimating weight parameters of a unified ranking function in accordance with the present disclosure. The major blocks of the process are described as follows.

Block 310 is to build a training corpus of at least one query in the first language (e.g., Chinese) and a corresponding set of candidate documents in both the first language and the second language (e.g., English). The training corpus may have multiple queries each corresponding to a set of candidate documents in the first and the second languages. Each candidate document, whether it is in the first language or the second language, is assigned a relevance rank in relation to the respective query. The assignment of the relevance ranks may be done manually by human annotators. The relevance ranks may have multiple levels, e.g. strongly-relevant, relevant, weakly-relevant, and non-relevant.

Block 320 is to generate feature vectors for each query-document pair in the training corpus in a feature space unified for the first and the second languages. The feature vectors that need to be generated will depend on the ranking function. The dimension N of the feature vector is determined by the number of features included. Referring to Equation (8) for the ranking function $\psi(q_c, d)$, when a document is in the first language, the ranking function is expressed with features $f_i$ (i=1, $n_f$), while when a document is in the second language, the ranking function is expressed with features $f_i$ (i=1, $n_f$), $g_j$ (j=1, $n_j$), and $h_k$ (k=1, $n_k$). It is thus possible to construct feature vectors of different dimensionalities for documents in different languages (the first language and the second language in the illustrated example). However, it is preferred to define a unified feature space to handle all languages, as shown below.

In one embodiment, all features are pooled together to define a comprehensive and unified feature space used for all documents, whether in the first language or in the second language. In the unified feature space, unrelated features have a value of zero in a feature vector. For example, for a document in the first language, the features only involved with documents in the second language are set to zero; and for a document in the second language, the features only involved with the first language are set to zero.

Block 330 is to perform supervised learning (e.g., SVM classification) using the training corpus and the assigned relevance ranks to optimize weight parameters of a unified ranking function. Given an input feature space with sample instances (feature vectors in the feature space), and given an output space of ranks (categories) represented by labels indicating an order, and a ranking function to determine the ranking order, optimization for determining the weight vector is a well-defined mathematical problem for which various solutions have been formulated. Any of the existing algorithms can be used for estimating the weight parameters in Equation (8) by optimizing the search ranks. An exemplary algorithm is Ranking SVM algorithm disclosed in Cao et al., Adapting Ranking SVM to Document Retrieval, in Proceedings of SIGIR 2006, the content of which is incorporated herein by reference.

Block 340 represents the trained weight parameters of the unified ranking function. With the weight parameters, the unified ranking function may be used to perform re-ranking of any new search results containing both documents in the first language and documents in the second language.

In the exemplary process of FIG. 3, supervised learning used in block 330 can be any of the existing learning algorithms. Conventional probabilistic classification or regression methods, such as SVM ordinal regression, etc., can be used for cross-lingual ranking under the presently described framework by identifying relevance labels of the documents. However, some of the newer ranking models, including RankSVM, RankNet, RankBoost, etc., may be more effective. Most of the more popular ranking models aim to classify the relevance order between a pair of documents. Recently, ranking algorithms which directly maximize some IR evaluation measures, such as Mean Average Precision (MAP) and Normalized Discounted Cumulative Gain (NDCG), are also proposed. In the following, an exemplary process using an SVM classification technique is illustrated with reference to FIG. 4.

Figure 4:
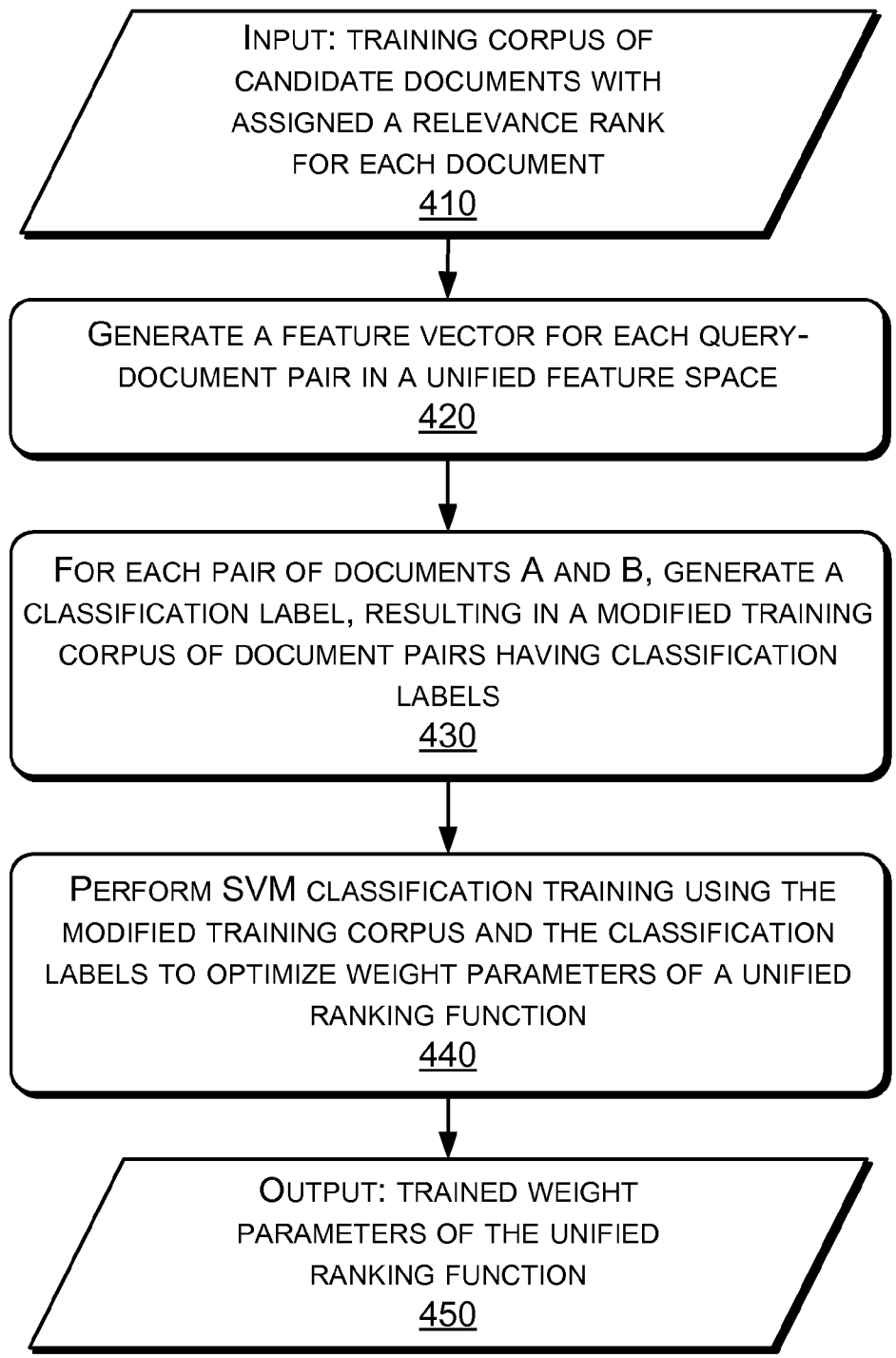
FIG. 4 is a flowchart of an exemplary process of estimating weight parameters of a unified ranking function using SVM classification.

FIG. 4 is a flowchart of an exemplary process of estimating weight parameters of a unified ranking function using SVM classification. The major blocks of the process are described as follows.

Block 410 represents an input training corpus of at least one query in the first language (e.g., Chinese) and a corresponding set of candidate documents in both the first language and the second language (e.g., English). The training corpus may have multiple queries each corresponding to a set of candidate documents in the first and the second languages.

Each candidate document, whether it is in the first language or the second language, is assigned a relevance rank in relation to the respective query. The assignment of the relevance ranks may be done manually by human annotators. The relevance ranks may have multiple levels, e.g. strongly-relevant, relevant, weakly-relevant, and non-relevant.

Block 420 is to generate feature vectors for each query-document pair in the training corpus in a feature space unified for the first and the second languages. The feature vectors that need to be generated depends on the ranking function. The dimension N of the feature vector is determined by the number of features included. Similar to the process of FIG. 3, although it is possible to construct feature vectors of different dimensionalities for documents in different languages, it is preferred to define a unified feature space to handle both languages. In one embodiment, all features of pooled together to define a comprehensive and unified feature space used for all documents, whether in the first language or in the second language. In the unified feature space, unrelated features have a value of zero in a feature vector.

At block 430, the learning algorithm generates a classification label for each pair of documents A and B in the training corpus (whether the document is in the first language or the second language). This effectively modifies the original input training corpus into a training corpus of document pairs having classification labels, and accordingly converts the ranking task into a classification task which can be handled by classification algorithms such as SVM classification methods. For example, given a pair of document A and B, if document A is more relevant than document B, then the document A-B pair is labeled as "1", otherwise the document pair is labeled as "0". Upon this labeling and conversion, conventional classification training (such as SVM classification training) may be applied on each document pair.

At block 440, the learning algorithm performs SVM classification training using the modified training corpus and the classification labels to optimize weight parameters of a unified ranking function. To apply the SVM classification training to the modified training corpus, appropriate conversion of the feature space and feature vectors may also need to be performed, as known in the art. For example, the sample feature vectors in an input feature space for the modified training corpus may need to be changed from single instances (e.g. $\bar{x}_i$ and $\bar{x}_j$) of the original feature vectors to instance pairs (e.g., $\bar{x}_i$-$\bar{x}_j$) The ranking function, whose direct outcome is a ranking order, is now used to determine the differences between ranks of instance pairs. This connection provides a basis for determining the weight parameters of the ranking function by running the SVM classification training over the modified training corpus. Specifically, given the input feature space and sample instance pairs, and given an output space of classification represented by labels and a ranking function to determine the ranking differences of the instance pairs, optimization for determining the weight vector can be performed. The optimization itself is a well-defined mathematical problem for which various solutions have been formulated. Any of the existing algorithms can be used for estimating the weight parameters in Equation (8) by optimizing the search rank differences.

Block 450 represents the trained (estimated) weight parameters of the unified ranking function. With the estimated weight parameters, the unified ranking function may be used to perform re-ranking of any new search results containing both documents in the first language and documents in the second language.

Any suitable feature function may be used for the feature functions $f_i$, $g_j$, and $h_k$. Examples of such feature functions are listed as follows.

Monolingual relevancy features $f_i(q_c, d_c)$: (1) snippet-based BM25 scores disclosed in Robertson et al., OKAPI at TREC-3, in *Proceedings TREC-3*, 1995; (2) snippet-based language model score disclosed in Ponte et al., A Language Modeling Approach to Information Retrieval, in *Proceedings of SIGIR*, 1998; (3) snippet-based tf-idf (term frequency-inverse document frequency) score; (4) title-based BM25 score; (5) title-based language model score; and (6) title-based tf-idf score.

Document translation features $h_k(d_c, d_e)$: IBM translation model score and phrase translation model score.

Query translation features $g_j(q_e, q_c)$: query translation features disclosed in Gao et al., Cross-Lingual Query Suggestion Using Query Logs of Different Languages, in *Proceedings of SIGIR* 2007. See below for further details.

In particular, features used for learning cross-lingual query similarity measure in Gao et al. may be used as query translation features $g_j(q_e, q_c)$.

Feature 1: Bilingual Dictionary-Based Scoring Using Term-Term Cohesion

The first feature used is bilingual dictionary-based scoring, which is illustrated below with an example using a built-in-house bilingual dictionary containing 120,000 unique entries to retrieve candidate queries. Since multiple translations may be associated with each source word, co-occurrence based translation disambiguation is performed. The process is as follows.

Given an input query $q_c = \{w_{c1}, w_{c2}, \ldots w_{cn}\}$ in the first language, for each query term $w_c$, a set of unique translations are provided by the bilingual dictionary D as: $D(w_{ci}) = \{t_{i1}, t_{i2}, \ldots, t_{im}\}$. Then the term-term cohesion between the translations of two query terms is measured using mutual information which is computed as:

$$MI(t_{ij}, t_{kl}) = P(t_{ij}, t_{kl}) \log \frac{P(t_{ij}, t_{kl})}{P(t_{ij})P(t_{kl})} \quad (9)$$

where $$P(t_{ij}, t_{kl}) = \frac{C(t_{ij}, t_{kl})}{N}, \; P(t) = \frac{C(t)}{N}.$$

Here C(x, y) is the number of queries in the query log containing both terms x and y, C(x) is the number of queries containing term x, and N is the total number of queries in the query log.

Based on the term-term cohesion defined in Equation (9), all possible query translations are ranked using the summation of the term-term cohesion $$S_{dict}(T_{q_c}) = \sum_{i,k,i \neq k} MI(t_{ij}, t_{kl}).$$

Top ranking query translations are then selected as $q_e$ to be used in the present analysis of the ranking function in Eqs. (1)-(8). For example, a set of top-4 query translations is selected and denoted as $S(T_{q_c})$. For each possible query translation $T \notin S(T_{q_c})$, the system retrieves from a query log in the second language queries containing the same keywords as T does. Preferably, all such available queries are retrieved. The retrieved queries are collected as candidate translation queries $q_e$, and are assigned $S_{dict}(T)$ as the value of the feature Dictionary-based Translation Score.

Feature 2: Bidirectional Translation Score Based on Parallel Corpora

The second feature that may be used is bidirectional translation score based on parallel corpora. Parallel corpora are valuable resources for bilingual knowledge acquisition. Different from the bilingual dictionary, the bilingual knowledge learned from parallel corpora assigns a probability for each translation candidate, which is useful information in acquiring dominant query translations.

In one embodiment, the Europarl corpus (a set of parallel French and English texts from the proceedings of the European Parliament) is used. The corpus is sentence aligned first. The word alignments are then derived by training an IBM translation model 1 using GIZA++. The learned bilingual knowledge is used to extract candidate queries from the query log. The process is as follows.

Given a pair of queries $q_c$ in the first language and $q_e$ in the second language, the Bi-Directional Translation Score is defined as follows:

$$S_{IBM1}(q_c, q_e) = \sqrt{p_{IBM1}(q_c|q_e) p_{IBM1}(q_e|q_c)} \quad (10)$$

where $p_{IBM1}(y|x)$ is the word sequence translation probability given by IBM model 1 which has the following form:

$$p_{IBM1}(y|x) = \frac{1}{(|x|+1)^{|y|}} \prod_{j=1}^{|y|} \sum_{i=0}^{|x|} p(y_j|x_i) \quad (11)$$

where $p(y_j|x_i)$ is the word to word translation probability derived from the word-aligned corpora.

One purpose to use the bidirectional translation probability is to deal with the fact that common words can be considered as possible translations of many words. By using bidirectional translation, one may test whether the translation words can be translated back to the source words. This is helpful to focus on the translation probability onto the most specific translation candidates.

Based on the above bidirectional translation scoring, top queries are selected. For example, given an input query $q_c$, the top ten queries $\{q_e\}$ having the highest bidirectional translation scores with $q_c$ are retrieved from the query log, and $S_{IBM1}(q_c, q_e)$ calculated in Equation (10) is assigned as the value for the feature Bi-Directional Translation Score.

Feature 3: Frequency in Web Mining Snippets and CODC Frequency

The third feature that may be used is frequency in Web mining snippets and Co-Occurrence Double-Check (CODC) frequency. Web mining has been used to acquire out-of-vocabulary words (OOV), which account for a major knowledge bottleneck for query translation and CLIR. For example, web mining has been exploited to acquire English-Chinese term translations based on the observation that Chinese terms may co-occur with their English translations in the same web page. In this disclosure, a similar web mining approach is adapted to acquire not only translations but semantically related queries in the second language.

It is assumed that if a query in the second language (the target language) co-occurs with the query in the first language (the source query) in many web pages, the two queries are probably semantically related. Therefore, a simple method is to send the source query to a search engine (e.g., Google search engine) to search for Web pages in the target language in order to find related queries in the target language. For instance, by sending a French query "pages jaunes" to search for English pages, the English snippets containing the key words "yellow pages" or "telephone directory" will be returned. However, this simple approach may induce significant amount of noise due to the non-relevant returns from the search engine. In order to improve the relevancy of the bilingual snippets, the simple approach is modified by using a more structured query.

An exemplary query modification is as follows. The original query is used with dictionary-based query keyword translations to perform a search. Both the original query and the dictionary-based query keywords translations are unified by the ∧(and) ∨(OR) operators into a single Boolean query. For example, for a given query q=abc where the set of translation entries in the dictionary of for a is $\{a_1, a_2, a_3\}$, b is $\{b_1, b_2\}$ and c is $\{c_1\}$, one may issue $q \land (a_1 \lor a_2 \lor a_3) \land (b_1 \lor b_2) \land c_1$ as one web query.

Top snippets returned by the modified and unified web query are retrieved to select candidate queries in second language. In one embodiment, the selection makes use of a query log in the second language to select only those Web mined queries that are also found in the query log. For example, from the returned top 700 snippets, the most frequent 10 target queries in the second language that are also in the query log are identified, and are associated with the feature Frequency in the Snippets.

Furthermore, Co-Occurrence Double-Check (CODC) Measure may be used to weight the association between the input query and the translation query (source and target queries). CODC Measure has been proposed as an association measure based on snippet analysis, named Web Search with Double Checking (WSDC) model. In WSDC model, two objects a and b are considered to have an association if b can be found by using a as query (forward process), and a can be found by using b as query (backward process) by web search. The forward process counts the frequency of b in the top N snippets of query a, denoted as freq(b@a). Similarly, the backward process count the frequency of a in the top N snippets of query b, denoted as freq(a@b). Then the CODC association score is defined as follows:

$$S_{CODC}(q_c, q_e) = \begin{cases} 0, & \text{if } freq(q_e @ q_c) \times freq(q_c @ q_e) = 0 \\ e^{[\log \frac{freq(q_e @ q_c)}{freq(q_c)} \times \frac{freq(q_c @ q_e)}{freq(q_e)}]^\alpha}, & \text{otherwise} \end{cases} \quad (12)$$

CODC measures the association of two terms in the range between 0 and 1, where under the two extreme cases, $q_e$ and $q_c$ are of no association when $freq(q_e @ q_c)=0$ or $freq(q_c @ q_e)=0$, and are of the strongest association when $freq(q_e @ q_c)=freq(q_c)$ and $freq(q_c @ q_e)=freq(q_e)$. In one experiment, $\alpha$ is set at 0.15 following the practice in.

A query $q_e$ mined from the Web will be associated with a feature CODC Measure with $S_{CODC}(q_c, q_e)$ as its value.

Feature 4: Monolingual Query Suggestion

The candidate queries in second language retrieved using the above-described bilingual dictionary, parallel corpora and web mining are pulled together as a set of candidate queries $Q_0$. A monolingual query suggestion system is called to produce more related queries in the second language using the set of candidate queries $Q_0$.

For a query $q_e$, its monolingual source query $SQ_{ML}(q_e)$ is defined as the query in $Q_0$ having the highest monolingual similarity with $q_e$, i.e., $$SQ_{ML}(q_e) = \arg\max_{q'_e \notin Q_0} \text{sim}_{ML}(q_e, q'_e) \quad (13)$$

The monolingual similarity between the query $q_e$ and $SQ_{ML}(q_e)$ is used as the value of the $q_e$'s Monolingual Query Suggestion Feature. A threshold may be set for selecting additional candidate queries in the second language using Equation (13). For example, if the monolingual similarity between a query $q_e$ and its source query $SQ_{ML}(q_e)$ meets or is above the threshold, the query $q_e$ is chosen to be a candidate query in the second language, in addition to the set of candidate queries $Q_0$. For any query that is already in $Q_0$ (i.e., $q \notin Q_0$), its Monolingual Query Suggestion Feature is set as 1, the maximum monolingual similarity value.

For any query $q_e \in Q_0$, its values of Dictionary-based Translation Score, Bi-Directional Translation Score, Frequency in the Snippet, and CODC Measure are set to be equal to the feature values of $SQ_{ML}(q_e)$. The queries $q_e$ in the second language used in this part may be from any suitable source. In one embodiment, however, the queries $q_e$ in the second language used in this part are selected from the query log of the search engine.

Implementation Environment

The above-described techniques may be implemented with the help of a computing device, such as a server, a personal computer (PC) or a portable device having a computing unit.

Figure 5:
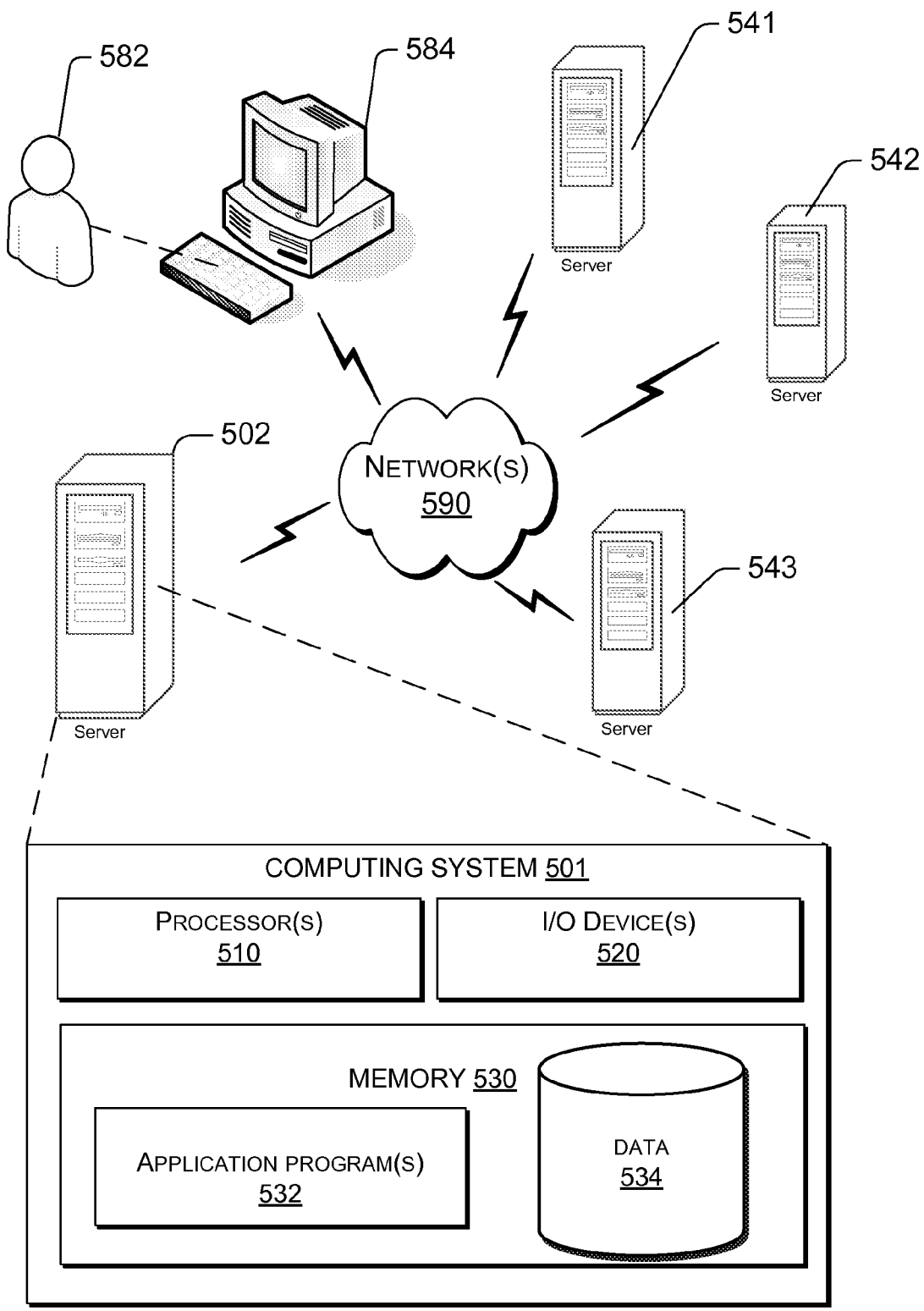
FIG. 5 shows an exemplary environment for implementing the method of the present disclosure.

FIG. 5 shows an exemplary environment for implementing the method of the present disclosure. Computing system 501 is implemented with computing device 502 which includes processor(s) 510, I/O devices 520, computer readable media (e.g., memory) 530, and network interface (not shown). The computer device 502 is connected to servers 541, 542 and 543 through networks 590. User 582 accesses computing system 501 (which is on the computing device 502) through user terminal 584.

The computer readable media 530 stores application program modules 532 and data 534 (such as monolingual and cross-lingual data). Application program modules 532 contain instructions which, when executed by processor(s) 510, cause the processor(s) 510 to perform actions of a process described herein (e.g., the processes of FIGS. 1-4).

For example, in one embodiment, computer readable medium 530 has stored thereupon a plurality of instructions that, when executed by one or more processors 510, causes the processor(s) 510 to perform the following actions:
 (i) for each document of the first set and the second set of documents, computing a value of a unified ranking function which is a function of the search query and the document; and
 (ii) ranking the first set of documents and the second set of documents together based on the values of the unified ranking function.

It is appreciated that the computer readable media may be any of the suitable memory devices for storing computer data. Such memory devices include, but not limited to, hard disks, flash memory devices, optical data storages, and floppy disks. Furthermore, the computer readable media containing the computer-executable instructions may consist of component(s) in a local system or components distributed over a network of multiple remote systems. The data of the computer-executable instructions may either be delivered in a tangible physical memory device or transmitted electronically.

It is also appreciated that a computing device may be any device that has a processor, an I/O device and a memory (either an internal memory or an external memory), and is not limited to a personal computer. For example, a computer device may be, without limitation, a server, a PC, a game console, a set top box, and a computing unit built in another electronic device such as a television, a display, a printer or a digital camera.

Especially, the computer device 502 may be a search engine server, or a cluster of such search engine servers.

CONCLUSIONS

Multilingual version of learning-to-rank described herein is targeted to learn a unified ranking function for documents of different languages. This is done by representing documents of different languages within a unified feature space and approaching the re-ranking in a manner similar to that for a monolingual ranking task. The cross-lingual re-ranking framework proposed herein differs from existing MLIR ranking systems using machine learning. The cross-lingual re-ranking disclosed herein directly learns the MLIR ranking functions within the learning-to-rank framework, and is able to learn the model based on individual feature functions. The resulting ranking algorithms therefore may be able to work optimally for Web MLIR which may involve a large number of ranking features.

It is appreciated that the potential benefits and advantages discussed herein are not to be construed as a limitation or restriction to the scope of the appended claims.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer readable media having stored thereupon a plurality of instructions that, when executed by a processor, cause the processor to perform the following actions:
 retrieving a first set of documents in a first language and a second set of documents in a second language via a cross-lingual search query that is based on a search query written in the first language;
 for each document of the first set and the second set of documents, computing a value of a unified ranking function that is a function of the search query and a corresponding document, the unified ranking function comprising a term descriptive of a cross-lingual query generative probability between the search query and the corresponding document, the cross-lingual query generative probability being a summation calculated based on a term descriptive of a probability of translating the search query from the first language to the second language and a term descriptive of a monolingual query generative probability of the search query being in the second language given an observation of a document in the second language; and
 ranking the first set of documents and the second set of documents together based on the values of the unified ranking function.

2. The one or more computer readable media of claim 1, wherein the term descriptive of the monolingual query generative probability between the search query ($q_c$) and the document ($d_c$) is expressed in terms comprising:

$$\sum_i \lambda_i f_i(q_c, d_c),$$

where $f_i(q_c, d_c)$ is a monolingual relevancy feature function used for estimating relevancy between the search query $q_c$ and the document $d_c$, and $\lambda_i$ is corresponding weight parameter, and i is an index that represents at least one $f_i(q_c,d_c)$.

3. The one or more computer readable media of claim 2, wherein the monolingual relevancy feature function $f_i(q_c,d_c)$ is selected from a group of feature functions including snippet-based BM25 score, snippet-based language model score, snippet-based tf-idf score, title-based BM25 score, title-based language model score, and title-based tf-idf score.

4. The one or more computer readable media of claim 2, wherein the monolingual query generative probability is estimated using a framework of discriminate regression.

5. The one or more computer readable media of claim 1, wherein the cross-lingual query generative probability between the search query ($q_c$) and a document ($d_e$) based on query translation is expressed in terms comprising:

$$\sum_{i,j} \mu_{ij} f_i(q_e, d_e) g_j(q_c, q_e),$$

where $q_e$ is a translation of the search query $q_c$ in the second language, $f_i(q_e,d_e)$ is a monolingual relevancy feature function used for estimating relevancy between $q_e$ as a search query in the second language and the document $d_e$, $g_j(q_c,q_e)$ is a feature function associated with query translation between the search query $q_c$ and the translation search query $q_e$, and $\mu_{ij}$ is corresponding weight parameter, and i is a first index that represents at least one $f_i(q_e,d_e)$, and j is a second index that represents at least one $g_j(q_c,q_e)$.

6. The one or more computer readable media of claim 5, wherein the weight parameter $\mu_{ij}$ is determined using a learning model having a training corpus.

7. The one or more computer readable media of claim 5, wherein the feature function $g_j(q_c,q_e)$ is selected from a group of feature functions including bilingual dictionary-based score based on term-term cohesion, bidirectional translation score based on parallel corpora, frequency in Web mining snippets, and monolingual query suggestion-based feature.

8. The one or more computer readable media of claim 1, wherein the cross-lingual query generative probability between the search query ($q_c$) and a document ($d_e$) based on document translation is expressed in terms comprising:

$$\sum_{i,k} \pi_{ik} f_i(q_c, d_c) h_k(d_c, d_e)$$

where $d_c$ is a translation of the document $d_e$ in the first language, $f_i(q_c,d_c)$ is a monolingual relevancy feature function used for estimating relevancy between the search query $q_c$ and the translation document $d_c$, $h_k(d_c,d_e)$ is a feature function associated with document translation between the translation document $d_c$ and the document $d_e$, and $h_{ij}$ is corresponding weight parameter, and i is a first index that represents at least one $f_i(q_c,d_c)$, and k is a second index that represents at least one $h_k(d_c,d_e)$.

9. The one or more computer readable media of as recited in claim 8, wherein the weight parameter $h_{ij}$ is determined using a learning model having a training corpus.

10. The one or more computer readable media of claim 8, wherein the feature function $h_k(d_c,d_e)$ is selected from IBM translation model score and phrase translation model score.

11. The one or more computer readable media of claim 1, wherein the unified ranking function is expressed in terms comprising:

$$\psi(q_c, d) = \begin{cases} \sum_i \lambda_i f_i(q_c, d_c) & \text{if } d \text{ is } d_c \\ \sum_{i,j} \mu_{ij} f_i(q_e, d_e) g_j(q_c, q_e) + \sum_{i,k} \pi_{ik} f_i(q_c, d_c) h_k(d_c, d_e) & \text{if } d \text{ is } d_e \end{cases},$$

where ranking function $\psi(q_c,d)$ is a function of the search query $q_c$ and document d of the first set and the second set of documents; document $d_e$ is one of the second set of documents in the second language; $\lambda_i$ is corresponding weight; $q_e$ is a translation of the search query $q_c$ in the second language; $f_i(q_e,d_e)$ is a monolingual relevancy feature function used for estimating relevancy between $q_e$ as a search query in the second language and the document $d_e$; $g_j(q_c,q_e)$ is a feature function associated with query translation between the search query $q_c$ and the translation search query $q_e$; $\mu_{ij}$ is corresponding weight parameter; $d_c$ is a translation of the document $d_e$ in the first language; $f_i(q_c,d_c)$ is a monolingual relevancy feature function used for estimating relevancy between the search query $q_c$ and the translation document $d_c$; $h_k(d_c,d_e)$ is a feature function associated with document translation between the translation document $d_c$ and the document $d_e$; and $h_{ij}$ is corresponding weight parameter, and i is a first index that represents at least one $f_i(q_e,d_e)$ and $f_i(q_c,d_c)$, j is a second index that represents at least one $g_j(q_c,q_e)$, k is a third index that represents at least one $h_k(d_c,d_e)$.

12. The one or more computer readable media of claim 11, wherein weight parameters $\lambda_i$, $\mu_{ij}$, and $h_{ij}$ are determined by optimizing search ranks using a ranking SVM algorithm applied to a training corpus.

13. The one or more computer readable media of claim 11, wherein weight parameters $\lambda_i$, $\mu_{ij}$, and $h_{ij}$ are determined by a learning algorithm applied to a training corpus, the training corpus including a training query, a set of training candidate documents in both the first language and a second language, and a relevance rank with respect to the training query assigned to each training candidate's document.

14. The one or more computer readable media of claim 1, wherein the first language is Chinese and the second language is English.

15. A cross-lingual search ranking method, comprising:
receiving a search query of a first language;
retrieving a first set of documents in the first language based on the search query;
retrieving a second set of documents in a second language based on the search query;
for each document of the first set and the second set of documents, computing a value of a unified ranking function that is a function of the search query and the document, the unified ranking function comprising a cross-lingual generative probability that is a summation calculated by multiplication of a term descriptive of a probability of translating the search query of the first language to the second language with a term descriptive of a monolingual query generative probability of the search query being in the second language given an observation of a document that is in the second language from the second set of documents; and ranking the first set of documents and the second set of documents together based on the values of the unified ranking function.

16. The method of claim 15, wherein the unified ranking function is expressed as:

$$\psi(q_c, d) = \begin{cases} \sum_i \lambda_i f_i(q_c, d_c) & \text{if } d \text{ is } d_c \\ \sum_{i,j} \mu_{ij} f_i(q_e, d_e) g_j(q_c, q_e) + \sum_{i,k} \pi_{ik} f_i(q_c, d_c) h_k(d_c, d_e) & \text{if } d \text{ is } d_e \end{cases},$$

where ranking function $\psi(q_c,d)$ is a function of the search query $q_c$ and the document d of the first set and the second set of documents; document $d_e$ is of the second set of documents in the second language; $\lambda_i$ is corresponding weight parameter; $q_e$ is a translation of the search query $q_c$ in the second language; $f_i(q_e,d_e)$ is a monolingual relevancy feature function used for estimating relevancy between $q_e$ as a search query in the second language and the document $d_e$; $g_j(q_c,q_e)$ is a feature function associated with query translation between the search query $q_c$ and the translation search query $q_e$; $\mu_{ij}$ is corresponding weight parameter; $d_c$ is a translation of the document $d_e$ in the first language; $f_i(q_c,d_c)$ is a monolingual relevancy feature function used for estimating relevancy between the search query $q_c$ and the translation document $d_c$; $h_k(d_c,d_e)$ is a feature function associated with document translation between the translation document $d_c$ and the document $d_e$; and $h_{ij}$ is corresponding weight parameter, and i is a first index that represents at least one $f_i(q_e,d_e)$ and $f_i(q_c,d_c)$, j is a second index that represents at least one $g_j(q_c,q_e)$, k is a third index that represents at least one $h_k(d_c,d_e)$.

17. The method of claim 16, wherein weight parameters $\lambda_i$, $\mu_{ij}$, and $h_{ij}$ are determined by optimizing search ranks using a ranking SVM algorithm over a training corpus.

18. One or more computer readable media having stored thereupon a plurality of instructions that, when executed by a processor, causes the processor to perform the following actions:
for each document of a first set and a second set of documents, computing a value of a unified ranking function that is a function of a search query and a corresponding document, the unified ranking function comprising a cross-lingual generative probability that is a summation calculated based on a first term descriptive of a probability of translating an observed document from the second set of documents that is in the second language to a first language and a second term descriptive of a monolingual query generative probability of the search query being in the first language given the observed document that is in the second language from the second set of documents; and ranking the first set of documents and the second set of documents together based on the values of the unified ranking function.

19. The one or more computer readable media of claim 18, wherein the unified ranking function is expressed in terms comprising:

$$\psi(q_c, d) = \begin{cases} \sum_i \lambda_i f_i(q_c, d_c) & \text{if } d \text{ is } d_c \\ \sum_{i,j} \mu_{ij} f_i(q_e, d_e) g_j(q_c, q_e) + \sum_{i,k} \pi_{ik} f_i(q_c, d_c) h_k(d_c, d_e) & \text{if } d \text{ is } d_e \end{cases},$$

where ranking function $\psi(q_c,d)$ is a function of the search query $q_c$ and document d of the first set and the second set of documents; document $d_e$ is one of the second set of documents in the second language; $f_i(q_c,d_c)$ is a monolingual relevancy feature function used for estimating relevancy between the search query $q_c$ and the document $d_c$; $\lambda_i$ is corresponding weight; $q_e$ is a translation of the search query $q_c$ in the second language; $f_i(q_e,d_e)$ is a monolingual relevancy feature function used for estimating relevancy between $q_e$ as a search query in the second language and the document $d_e$; $g_j(q_c,q_e)$ is a feature function associated with query translation between the search query $q_c$ and the translation search query $q_e$; $\mu_{ij}$ is corresponding weight parameter; $d_c$ is a translation of the document $d_e$ in the first language; $f_i(q_c,d_c)$ is a monolingual relevancy feature function used for estimating relevancy between the search query $q_c$ and the translation document $d_c$; $h_k(d_c,d_e)$ is a feature function associated with document translation between the translation document $d_c$ and the document $d_e$; and $h_{ij}$ is corresponding weight parameter, and i is a first index that represents at least one $f_i(q_e,d_e)$ and $f_i(q_c,d_c)$, j is a second index that represents at least one $g_j(q_c,q_e)$, k is a third index that represents at least one $h_k(d_c,d_e)$.

20. The one or more computer readable media of claim 18, wherein the term descriptive of the monolingual query generative probability between the search query ($q_c$) and the document ($d_c$) is expressed in terms comprising:

$$\sum_i \lambda_i f_i(q_c, d_c),$$

where $f_i(q_c,d_c)$ is a monolingual relevancy feature function used for estimating relevancy between the search query $q_c$ and the document $d_c$, and $\lambda_i$ is corresponding weight parameter, and i is an index that represents at least one $f_i(q_c,d_c)$.

* * * * *